United States Patent
Gao et al.

(10) Patent No.: US 12,393,460 B2
(45) Date of Patent: Aug. 19, 2025

(54) METHOD AND APPARATUS FOR ACCELERATING INFERENCE OF NEURAL NETWORK MODEL, ELECTRONIC DEVICE, AND MEDIUM

(71) Applicant: NANJING HORIZON ROBOTICS INTEGRATED CIRCUIT CO., LTD., Nanjing (CN)

(72) Inventors: Yushu Gao, Nanjing (CN); Shuqian Qu, Nanjing (CN); Wen Dai, Nanjing (CN); Kaiwen Kong, Nanjing (CN)

(73) Assignee: NANJING HORIZON ROBOTICS INTEGRATED CIRCUIT CO., LTD., Nanjing (CN)

( * ) Notice: Subject to any disclaimer, the term of this patent is extended or adjusted under 35 U.S.C. 154(b) by 132 days.

(21) Appl. No.: 18/467,349

(22) Filed: Sep. 14, 2023

(65) Prior Publication Data
US 2024/0095078 A1    Mar. 21, 2024

(30) Foreign Application Priority Data
Sep. 16, 2022   (CN) .......... 202211133732.9

(51) Int. Cl.
*G06F 9/50*    (2006.01)
*G06F 1/03*    (2006.01)

(52) U.S. Cl.
CPC .......... *G06F 9/5027* (2013.01); *G06F 1/0307* (2013.01)

(58) Field of Classification Search
None
See application file for complete search history.

(56) References Cited

U.S. PATENT DOCUMENTS

2017/0277658 A1   9/2017   Pratas et al.
2019/0147323 A1   5/2019   Li et al.
2023/0412230 A1*  12/2023  Saber .............. G06N 20/10

FOREIGN PATENT DOCUMENTS

CN    107003989 A    8/2017
CN    110084362 A    8/2019
(Continued)

OTHER PUBLICATIONS

First Chinese Office action from corresponding Chinese patent application No. 2022111337329, mailed on Jun. 11, 2025 and its English translation.
(Continued)

*Primary Examiner* — Scott C Sun
(74) *Attorney, Agent, or Firm* — K&L Gates LLP

(57) ABSTRACT

Disclosed are a method and apparatus for accelerating inference of a neural network model, an electronic device, and a medium. The method includes: acquiring image training data, text training data, or speech training data; determining a first neural network model to be accelerated; converting a preset operation on a preset network layer in the first neural network model to a first operation for simulating operational logic of a target operation to obtain a second neural network model; performing, based on the image training data, the text training data, or the speech training data, quantization aware training on the second neural network model by a preset bit width to obtain a third neural network model which is quantized; and converting the first operation of the third neural network model to the target operation, to obtain a target neural network model, which is accelerated, corresponding to the first neural network model.

20 Claims, 6 Drawing Sheets

(56) References Cited

FOREIGN PATENT DOCUMENTS

| | | |
|---|---|---|
| CN | 111915003 A | 11/2020 |
| CN | 113191494 A | 7/2021 |
| CN | 113361678 A | 9/2021 |
| JP | 2022540298 A | 9/2022 |

OTHER PUBLICATIONS

Sari et al., "iRNN: Integer-only Recurrent Neural Network", Feb. 14, 2022, pp. 1-12.
Extended European Search Report from corresponding European Patent Application No. 231977281, mailed on Feb. 13, 2024.
First Japanese Office Action from corresponding Japanese Patent Application No. 2023-145330, mailed on Oct. 1, 2024 and its English translation.
Sari et al., "iRNN: Integer-only Recurrent Neural Network", arxiv.org, Sep. 20, 2021.
Plagwitz et al., TRAC: Compilation-Based Design of Transformer Accelerators for FPGAs, IEEE, Aug. 29, 2022, pp. 17-23.

* cited by examiner

US 12,393,460 B2

METHOD AND APPARATUS FOR ACCELERATING INFERENCE OF NEURAL NETWORK MODEL, ELECTRONIC DEVICE, AND MEDIUM

RELATED APPLICATION INFORMATION

This application claims priority to Chinese patent application Ser. No. 202211133732.9 filed on Sep. 16, 2022, incorporated herein by reference.

FIELD OF THE INVENTION

The present disclosure relates to technologies of artificial intelligence, and in particular, to a method and apparatus for accelerating inference of a neural network model, an electronic device, and a medium.

BACKGROUND OF THE INVENTION

In the field of deep learning, functions such as softmax, sigmoid, and swish are very important parts of a neural network model. However, operations of these functions are complex with high computational costs, resulting in a lower inference speed for the neural network model. To resolve this problem, these complex operations are usually simplified in related technologies, for example, by performing softmax calculation through a combination of multiple lookup table and four arithmetic operations on lookup table results, so as to reduce the computational costs. However, the prior simplification manner may easily result in low model accuracy.

SUMMARY OF THE INVENTION

To resolve technical problems such as low model accuracy caused by the foregoing simplification manner, the present disclosure is proposed. Embodiments of the present disclosure provide a method and apparatus for accelerating inference of a neural network model, an electronic device, and a medium.

According to an aspect of an embodiment of the present disclosure, a method for accelerating inference of a neural network model is provided, including: acquiring image training data, text training data, or speech training data; determining a first neural network model to be accelerated; converting a preset operation on a preset network layer in the first neural network model to a first operation for simulating operational logic of a target operation to obtain a second neural network model; performing, based on the image training data, the text training data, or the speech training data, quantization aware training on the second neural network model by a preset bit width to obtain a third neural network model which is quantized, where the preset bit width is a bit width supported by a neural network accelerator for data processing; and converting the first operation of the third neural network model to the target operation, to obtain a target neural network model, which is accelerated, corresponding to the first neural network model.

According to another aspect of an embodiment of the present disclosure, a method for accelerating inference of a neural network model is provided, including: acquiring to-be-processed data, where the to-be-processed data is image data, text data, or speech data; and determining output data corresponding to the to-be-processed data based on a target neural network model, which is accelerated, corresponding to a pre-obtained first neural network model, where the target neural network model is obtained by using the method for accelerating inference of a neural network model according to any one of the foregoing embodiments.

According to still another aspect of an embodiment of the present disclosure, an apparatus for accelerating inference of a neural network model is provided, including: a first acquisition module, configured to acquire image training data, text training data, or speech training data; a first determination module, configured to determine a first neural network model to be accelerated; a first processing module, configured to convert a preset operation on a preset network layer in the first neural network model to a first operation for simulating operational logic of a target operation to obtain a second neural network model; a second processing module, configured to perform, based on the image training data, the text training data, or the speech training data, quantization aware training on the second neural network model by a preset bit width to obtain a third neural network model which is quantized, where the preset bit width is a bit width supported by a neural network accelerator for data processing; and a third processing module, configured to convert the first operation of the third neural network model to the target operation, to obtain a target neural network model, which is accelerated, corresponding to the first neural network model.

According to yet another aspect of an embodiment of the present disclosure, an apparatus for accelerating inference of a neural network model is provided, including: a second acquisition module, configured to acquire to-be-processed data, where the to-be-processed data is image data, text data, or speech data; and a fourth processing module, configured to determine output data corresponding to the to-be-processed data based on a target neural network model, which is accelerated, corresponding to a pre-obtained first neural network model, where the target neural network model is obtained by using the method for accelerating inference of a neural network model according to any one of the foregoing embodiments.

According to still yet another aspect of an embodiment of the present disclosure, a computer readable storage medium is provided, in which a computer program is stored, wherein the computer program is used for implementing the method for accelerating inference of a neural network model according to any one of the foregoing embodiments of the present disclosure.

According to a further aspect of an embodiment of the present disclosure, an electronic device is provided, where the electronic device includes: a processor; and a memory configured to store a processor-executable instruction, where the processor is configured to read the executable instruction from the memory and execute the instruction to implement the method for accelerating inference of a neural network model according to any one of the foregoing embodiments of the present disclosure.

According to a still further aspect of an embodiment of the present disclosure, a computer program product is provided. When instructions in the computer program product are executed by a processor, the method for accelerating inference of a neural network model according to any one of the foregoing embodiments is implemented.

According to the method and apparatus for accelerating inference of a neural network model, the electronic device, and the medium that are provided in the foregoing embodiments of the present disclosure, by converting the complex preset operation in the neural network to the simple target operation and simulating the operational logic of the target operation during the quantization aware training process, errors caused by the simplified target operation may be simulated during a training process. In this case, the target neural network model ensures that model accuracy does not decrease when operations are simplified, thereby effectively resolving a problem of low model accuracy caused by simplification manners in prior technologies.

The technical solutions of the present disclosure are further described below in detail with reference to the accompanying drawings and the embodiments.

DETAILED DESCRIPTION OF THE EMBODIMENTS

Exemplary embodiments of the present disclosure are described below in detail with reference to the accompanying drawings. Obviously, the described embodiments are merely a part, not all, of embodiments of the present disclosure. It should be understood that the present disclosure is not limited by the exemplary embodiments described herein.

It should be noted that, unless otherwise specified, the scope of the present disclosure is not limited by relative arrangement, numeric expressions, and numerical values of components and steps described in these embodiments.

Overview of Present Disclosure

In a process of implementing the present disclosure, the inventor finds that, in the field of deep learning, functions such as softmax, sigmoid, and swish are very important parts of a neural network model. However, operations of these functions are complex with high computational costs, resulting in a lower inference speed for the neural network model. To resolve this problem, these complex operations are usually simplified in related technologies, for example, by performing softmax calculation through a combination of multiple lookup tables and four arithmetic operations on lookup table results, so as to reduce the computational costs. However, the prior simplification manner may easily result in low model accuracy.

Exemplary Overview

Figure 1:
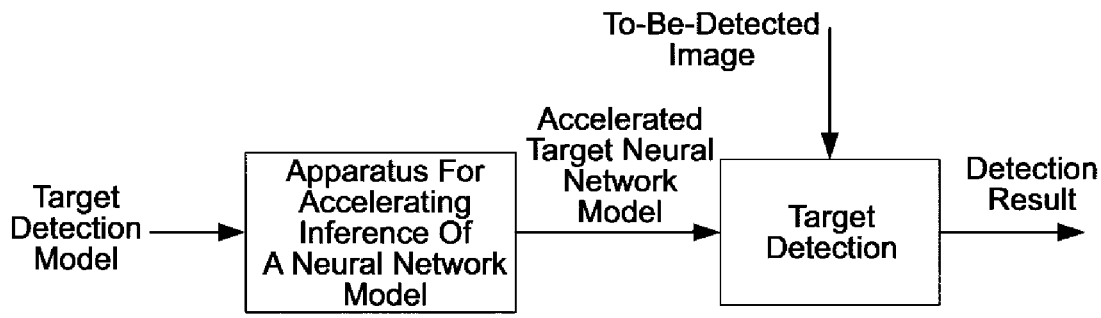
FIG. 1 is an exemplary application scenario of a method for accelerating inference of a neural network model according to the present disclosure.

FIG. 1 is an exemplary application scenario of a method for accelerating inference of a neural network model according to the present disclosure.

In a target detection application scenario of a neural network under the Transformer series, a Transformer-based target detection model is usually used to perform a target detection on a to-be-detected image to obtain a detection result. An encoder and a decoder of a Transformer network architecture of the target detection model involve multi-headed self-attention (MSA for short) network blocks. A self-attention operation of the multi-headed self-attention network block involves a softmax function. Operations of the softmax function include an exponential operation. An apparatus for accelerating inference of a neural network model in the present disclosure is used to implement the method for accelerating inference of a neural network model in the present disclosure. The target detection model may be used as a first neural network model to be accelerated. An exponential operation on a softmax layer in the first neural network model is converted to a first operation for simulating operational logic of a target operation to obtain a second neural network model. The target operation is a simplified operation, such as a lookup table operation. Quantization aware training is performed on the second neural network model based on image training data by a preset bit width, to obtain a third neural network model which is quantized. The preset bit width may be a bit width supported by a neural network accelerator for data processing. After the quantization aware training is completed, the first operation of the third neural network model is converted to the target operation, to obtain a target neural network model, which is accelerated, corresponding to the first neural network model. The exponential operation on the softmax layer is performed through the target neural network model based on the simplified target operation, so that computational complexity may be reduced. Moreover, the operational logic of the simplified target operation is simulated during the quantization aware training process, so that errors caused by a simplified operation are simulated. In this way, the obtained target neural network model still has high accuracy on the basis of low computational complexity, thereby resolving a problem of low model accuracy in prior simplified operations.

Exemplary Method

Figure 2:
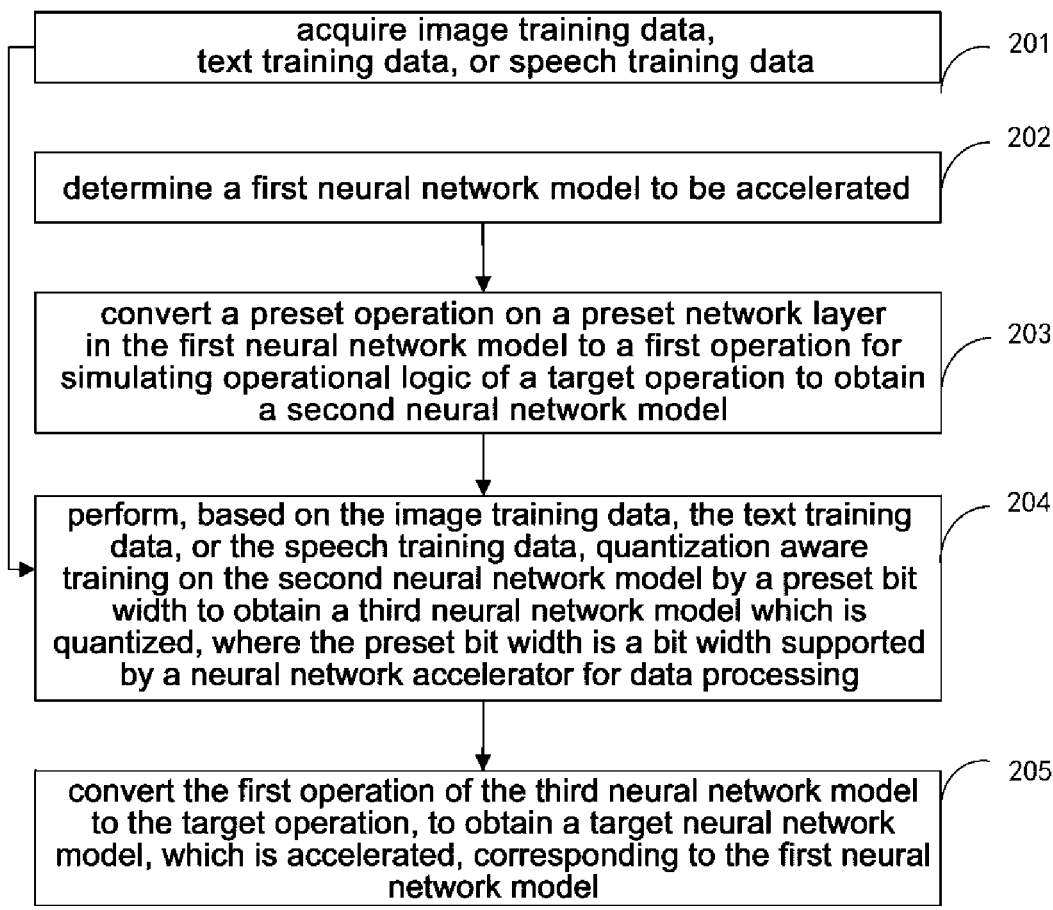
FIG. 2 is a schematic flowchart illustrating a method for accelerating inference of a neural network model according to an exemplary embodiment of the present disclosure.

FIG. 2 is a schematic flowchart illustrating a method for accelerating inference of a neural network model according to an exemplary embodiment of the present disclosure. This embodiment may be applied to an electronic device such as a server or a terminal. As shown in FIG. 2, the method includes the following steps.

Step 201. Acquire image training data, text training data, or speech training data.

The image training data may be image data of any scenario, such as image data of a road environment that is collected from an autonomous driving scenario, medical image data or the like, which may be specifically set according to actual requirements. The text training data may be text data of any scenario, such as text data of any scenario that requires textual semantic recognition. The speech training data may be speech data of any scenario, such as speech data collected by a smart home for speech control, or speech data for speech control on a vehicle, which may be specifically set according to actual requirements. A specific type of data to be acquired may depend on a neural network model that actually needs to be accelerated. For example, if the neural network model to be accelerated is a target detection model for a road element in the autonomous driving scenario, the pre-obtained image data of the road environment is acquired to serve as the image training data.

Step 202. Determine a first neural network model to be accelerated.

The first neural network model may be a model for any application scenario. The first neural network model is a full precision model obtained through pre-training. For example, when the target detection model for the road element in the autonomous driving scenario needs to be accelerated, the target detection model is used as the first neural network model to be accelerated. The first neural network model needs to be adapted to the training data obtained in step 201. In practical applications, the training data and the first neural network model may be pre-stored in a certain storage space. For example, addresses of the training data and the first neural network model to be accelerated are obtained through corresponding storage, address association, or user designation, which may be specifically set according to actual requirements, and is not limited in the present disclosure.

Step 203. Convert a preset operation on a preset network layer in the first neural network model to a first operation for simulating operational logic of a target operation to obtain a second neural network model.

The preset network layer and the preset operation on the preset network layer may be set according to actual requirements. For example, when the first neural network model is a Transformer-based target detection model, the preset network layer may be a softmax layer, and the preset operation may be an exponential operation in softmax; or the preset network layer may be a self-attention network layer, and the preset operation may be an exponential operation on the self-attention network layer. For another example, for the first neural network model with a sigmoid activation function, the preset network layer may be a sigmoid activation layer, and the preset operation may be an exponential operation on the sigmoid activation layer. This is not specifically limited. The target operation is a simplified operation corresponding to the preset operation, such as a lookup table operation or a linear fitting operation. The first operation is used to simulate the operational logic of the target operation. For example, in the lookup table operation, a target subrange to which input data for lookup table belongs needs to be determined first. Operation results respectively corresponding to two endpoints of the target subrange are obtained through lookup table based on the target subrange. A result of the target operation corresponding to the input data for lookup table is obtained by means of linear interpolation based on the operation results respectively corresponding to the two endpoints. In this case, in the first operation, a first subrange to which first input data of the first operation belongs may be determined first, operation results respectively corresponding to two endpoints of the first subrange may be determined, then a first operation result corresponding to the first input data may be obtained by means of linear interpolation based on the operation results respectively corresponding to the two endpoints, and accordingly the operational logic of the target operation is simulated. The operation results respectively corresponding to the two endpoints of the first subrange may be obtained through real-time calculation, or may be obtained through lookup table, which may be specifically set according to actual requirements.

In practical applications, the preset network layer may include one or more types of network layers, and a preset algorithm may include one or more algorithms. For example, when a model includes both a softmax function and a sigmoid activation function, the preset network layer may include a normalized network layer where the softmax function is located and an activation layer where the sigmoid activation function is located, and the preset operation may include an exponential operation in softmax and an exponential operation in sigmoid, which may be specifically set according to actual requirements, and is not limited in the present disclosure. For complex preset operations of any preset network layer, model acceleration may be implemented by using the method is the present disclosure.

Steps 201, 202, and 203 do not represent a sequential order.

Step 204. Perform, based on the image training data, the text training data, or the speech training data, quantization aware training on the second neural network model by a preset bit width to obtain a third neural network model which is quantized, where the preset bit width is a bit width supported by a neural network accelerator for data processing.

The preset bit width may be set according to actual requirements, for example, may be 8 bits, 16 bits, 4 bits, 2 bits, or 1 bit. Specifically, the preset bit width may be an 8-bit integer (int8). The quantization aware training is to insert a fake quantization node into a model to simulate rounding and clamping operations that are performed by a quantization model during an inference process, thereby improving adaptability of the module to quantitative data and achieving higher accuracy of the quantization model during a training process. Quantized objects may include weight, activation function output, gradient, and the like, which may be set according to actual requirements. Quantifying the weight and the activation function output may effectively reduce space occupied by a memory of the model, and quantifying the gradient may reduce overhead of reverse calculation. Whether the specific training data may be the image training data, the text training data, or the voice training data depending on a specific application scenario of the second neural network model or the first neural network model described above. For a certain model, a type of training data required for quantization aware training of the module is determined, which may be one of the image training data, the text training data, and the speech training data described above. The bit width supported by the neural network accelerator for data processing refers to a bit width of a network parameter (such as the weight), input data, output data, or intermediate data (such as the activation function output) supported by the neural network accelerator when inference calculation of the neural network is performed based on the neural network accelerator. For example, if the neural network accelerator supports a bit width of int8, input of each data processing module in the neural network accelerator needs to be data of int8, and weight used for calculation is also data of int8, which may be specifically set according to actual requirements. A bit width supported by a full-precision neural network model is typically a 64-bit floating point number (float 64) or a 32-bit floating point number (float 32). To accelerate an inference speed of the neural network model based on the neural network accelerator, it is needed to quantify various data of the full-precision neural network model to the bit width supported by the neural network accelerator. Therefore, by quantifying the full-precision neural network model according to the bit width supported by the neural network accelerator for data processing, the qualified neural network model can be deployed to the neural network accelerator for inference calculation, thereby accelerating inference of the neural network model. Moreover, a low-bit quantized neural network model occupies less storage space, thereby effectively reducing memory occupation of the inference process.

In practical applications, same or different preset bit widths may be set for quantization of the weight, the activation function output, and the gradient of the model, which may be specifically set according to actual requirements, and is not limited in the present disclosure.

Optionally, during the quantization aware training process, forward and backward propagation calculation of the model and calculation of the fake quantization node may be implemented through calculation of the floating point number, as long as rules (such as rounding and clamping) related to a fixed point with the preset bit width are followed. After the training is completed, the model is quantized into a true fixed point model as the third neural network model.

For example, during the quantization aware training process, a floating point number 0.1 may be used to represent a fixed point number 1, a floating point number 0.2 may be used to represent a fixed point number 2, and the others may be deduced by analogy. In this case, the floating point number and the fixed point number have a fixed multiple relationship, and follow rules of the fixed point number during the training process. For example, if a fixed point number of 3.5 may be rounded up or down to 4 or 3, a floating point number of 0.35 may be converted up or down to 0.4 or 0.3. In this way, floating point numbers that follow rules of the fixed point number may be used to determine network losses, so as to simulate losses caused by simplified operations. After the training is completed, a floating-point model is converted into a fixed-point model through numerical conversion of the model, without reducing model accuracy.

Step 205. Convert the first operation of the third neural network model to the target operation, to obtain a target neural network model, which is accelerated, corresponding to the first neural network model.

Because the first operation is used to simulate the operational logic of the target operation, after the quantization aware training is completed, the first operation of the third neural network model may be directly converted into the target operation. The target neural network model after the conversion has same accuracy as the third neural network model, so that accuracy of the model may not be reduced while computational complexity of the model is reduced.

For example, the softmax function is represented as follows:

$$softmax(x_i) = \frac{e^{x_i}}{\sum_j e^{x_j}}$$

After an exponential operation $F(x)=e^x$ is converted into a lookup table operation, calculation is as follows:

$$F(x)=LUT_{exp}(x)$$

LUT (Look Up Table) represents a lookup table operation, and $LUT_{exp}(x)$ indicates that a lookup table operation is performed on input x to obtain a corresponding exponential operation result. Specifically, an interval in a table to which x belongs is first determined, and exponential operation results corresponding to two endpoints of the interval are obtained through lookup table. Linear interpolation is performed based on the exponential operation results of the two endpoints, to obtain the exponential operation result corresponding to x. Due to large computational complexity of a computer in calculating a value of an exponential function (for example, by using Taylor series expansion or other possible methods), the converting of the exponential operation into a lookup table operation merely requires simple comparison, searches, and linear interpolation to quickly obtain the exponential operation result, thus effectively reducing the computational complexity of the model and improving an inference speed of the model.

According to the method for accelerating inference of a neural network model provided in this embodiment, by converting the complex preset operation in the neural network to the simple target operation and simulating the operational logic of the target operation during the quantization aware training process, errors caused by the simplified target operation may be simulated during the training process. In this case, the target neural network model ensures that the model accuracy does not decrease when operations are simplified, thereby effectively resolving a problem of low model accuracy caused by simplification manners in prior technologies.

Figure 3:
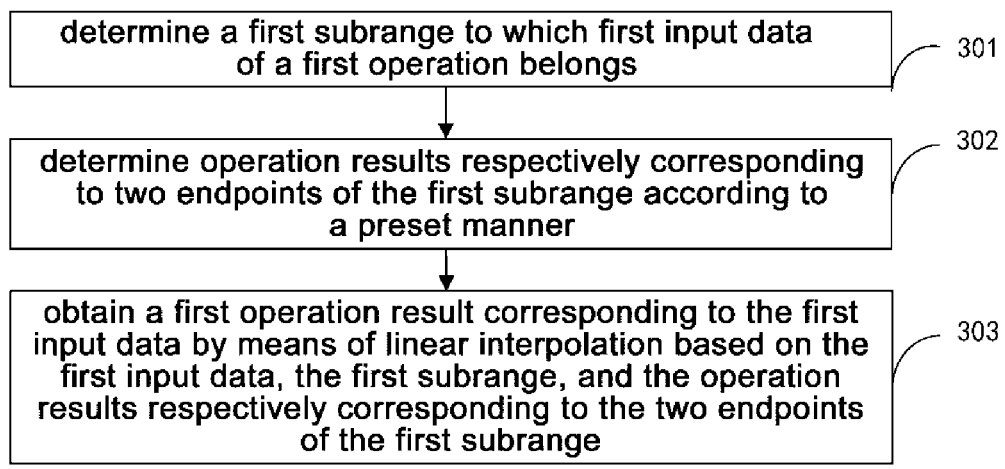
FIG. 3 is a schematic flowchart illustrating a first operation according to an exemplary embodiment of the present disclosure.

FIG. 3 is a schematic flowchart illustrating a first operation according to an exemplary embodiment of the present disclosure.

In an optional example, the target operation is a lookup table operation. The first operation may specifically include the following steps.

Step 301. Determine a first subrange to which first input data of the first operation belongs.

A first input range may be determined based on the input data of the preset operation during a training process of the first neural network model. The first input range is divided into a plurality of subranges, and operation results corresponding to endpoints of each subrange are calculated. All subranges and the operation results corresponding to the endpoints of each subrange are stored, or all subranges are stored, which may be specifically set according to actual requirements. Thus, when the first operation is required, the first subrange to which the first input data belongs may be determined by comparing the first input data with the endpoints of each subrange.

Step 302. Determine operation results respectively corresponding to two endpoints of the first subrange according to a preset manner.

The preset manner may include two manners: calculation and lookup table. Because the second neural network model is used for quantization aware training, the operation results respectively corresponding to the two endpoints of the first subrange may be calculated in a real-time manner in actual operation during the training process, or the operation results respectively corresponding to the endpoints of each subrange may be calculated in advance for storage, and then, during the operation, the operation results respectively corresponding to the two endpoints of the first subrange may be directly obtained from a storage area. No matter which manner is used, accuracy of simulating the operational logic of the target operation by using the first operation may not be affected. To further reduce computational complexity of the quantization aware training, the operation results respectively corresponding to the two endpoints of the first subrange may be determined by means of lookup table.

Step 303. Obtain a first operation result corresponding to the first input data by means of linear interpolation based on the first input data, the first subrange, and the operation results respectively corresponding to the two endpoints of the first subrange.

The linear interpolation refers to an interpolation manner where an interpolation function is a linear polynomial, and a specific interpolation principle is not described in detail. To simulate operational logic of the lookup table operation, after the operation results respectively corresponding to the two endpoints of the first subrange are determined, linear interpolation is performed on the first input data based on the operation results respectively corresponding to the two endpoints of the first subrange, to obtain the first operation result corresponding to the first input data.

According to the present disclosure, the first operation is used in the second neural network model to simulate the lookup table operation, so that errors caused by the lookup table operation can be simulated during the quantization aware training process. When the training is completed, the model may also achieve high accuracy same as or similar to that of the first neural network model under data quantization, without causing a significant decrease in model accuracy by the lookup table operation.

Figure 4:
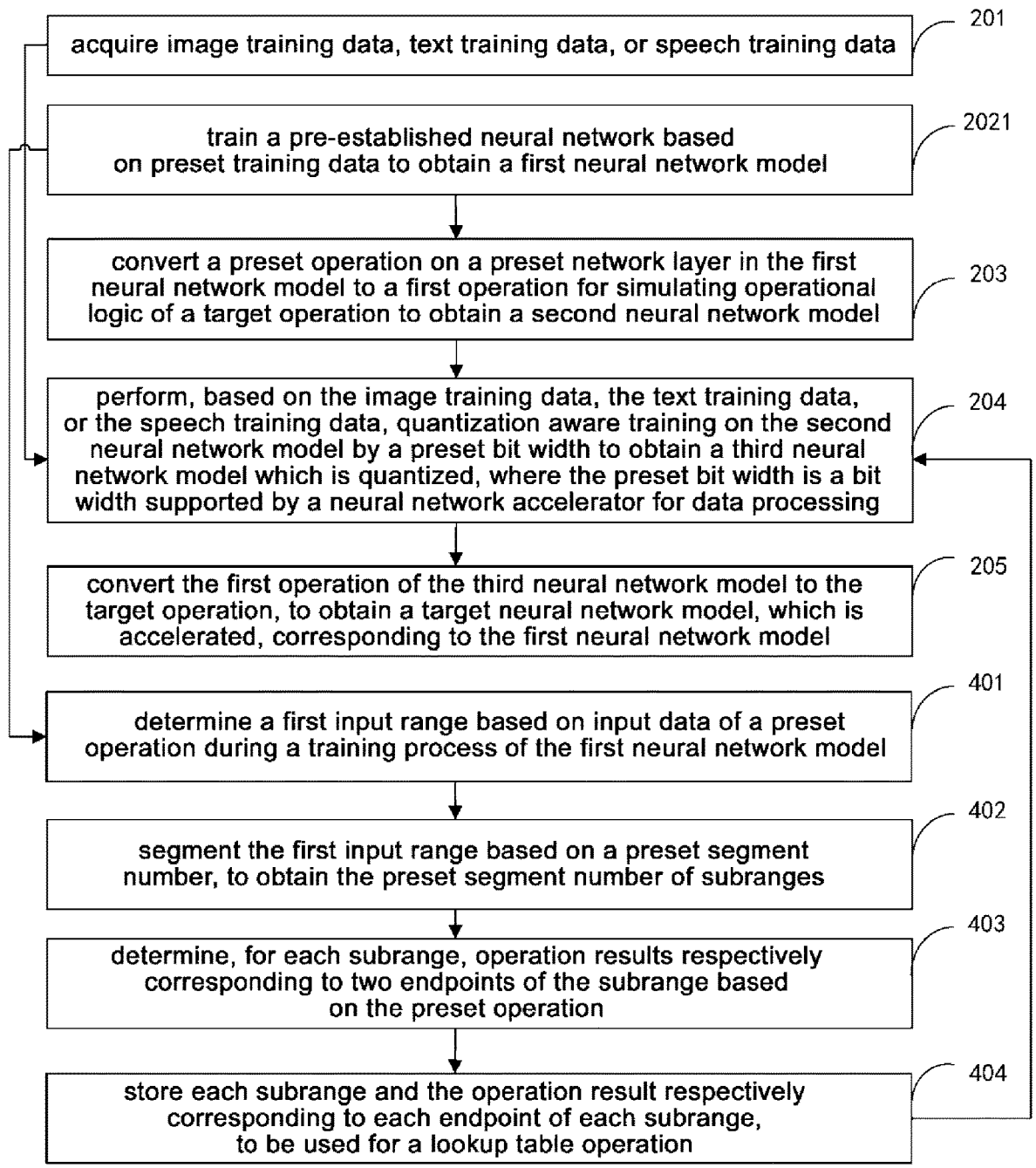
FIG. 4 is a schematic flowchart illustrating a method for accelerating inference of a neural network model according to another exemplary embodiment of the present disclosure.

FIG. 4 is a schematic flowchart illustrating a method for accelerating inference of a neural network model according to another exemplary embodiment of the present disclosure.

In an optional example, the target operation is a lookup table operation. After step 202 of determining the first neural network model to be accelerated, the method in the present disclosure further includes the following steps.

Step 401. Determine a first input range based on input data of a preset operation during a training process of the first neural network model.

During a process of obtaining the first neural network model through training, the input data of the preset operation may be recorded, and the first input range is determined in consideration of a range of the input data of the preset operation that is recorded in the training process.

In practical applications, because the first input range is applied to a lookup table operation for the quantization aware training, the input data of the preset operation of the first neural network model is a floating point number. The first input range suitable for the quantization aware training may be determined based on the input data of the floating point number. For example, in the second neural network model, if input of the first operation is a floating point number 0.2 for simulating a fixed point number 2 with a preset bit width, and the range of the input data of the preset operation is 0.001-0.999, the first input range is determined to be 0.0-1.0, which may be specifically set according to actual requirements.

Step 402. Segment the first input range based on a preset segment number, to obtain the preset segment number of subranges.

The preset segment number may be set according to actual requirements, for example, may be set to 100 segments, 50 segments, or 20 segments. This is not limited in this embodiment of the present disclosure.

For example, 0.0-1.0 is divided into 5 subranges, which respectively are: 0.0-0.2, 0.2-0.4, 0.4-0.6, 0.6-0.8, and 0.8-1.0. A specific division manner for each subrange may be set according to actual requirements. The subranges may be divided equally or unequally, which is not limited in this embodiment of the present disclosure.

Step 403. Determine, for each subrange, operation results respectively corresponding to two endpoints of the subrange based on the preset operation.

The operation results of the two endpoints of each subrange may be obtained based on the preset operation, such as an exponential operation. Accurate operation results of the two endpoints of each subrange are calculated based on the exponential operation.

Step 404. Store each subrange and the operation result respectively corresponding to each endpoint of each subrange, to be used for a lookup table operation.

After the operation result respectively corresponding to each endpoint of each subrange is pre-stored, during the quantization aware training process, when performing the first operation, the operation results respectively corresponding to the two endpoints of the first subrange may be determined after the first subrange to which the first input data of the first operation belongs is determined. In this way, the first operation result corresponding to the first input data is obtained by performing linear interpolation based on the operation results of the two endpoints. Thus, the operational logic of the lookup table operation is simulated during the quantization aware training process, thereby ensuring that model accuracy may not decrease after the preset operation is converted into the target operation later.

According to the present disclosure, a range of input data of the first operation is segmented to determine all subranges for the lookup table operation and the operation result respectively corresponding to each subrange for storage. Thus, during the quantization aware training process, for the first operation, the operation results of the two endpoints of the first subrange to which the first input data of the first operation belongs may be obtained through the lookup table operation. Further, the first operation result corresponding to the first input data is obtained based on linear interpolation, thereby reducing computational complexity of the quantization aware training process, and improving training efficiency.

In an optional example, step 202 of determining the first neural network model to be accelerated includes:

Step 2021. Train a pre-established neural network based on preset training data to obtain the first neural network model.

The preset training data may be the image training data, the text training data, or the speech training data, which depends on an application scenario of the first neural network model. The preset training data may be the training data used for quantization aware training as described above, or may be training data besides the training data used for the quantization aware training, which may be specifically set according to actual requirements, and is not limited in this embodiment of the present disclosure. The pre-established neural network may be set according to actual requirements, for example, may be a Transformer network for object detection or another implementable network. The training process of the first neural network model includes: the preset training data is used as input of the neural network to obtain output of the neural network; network losses are determined based on label data corresponding to the preset training data and the output of the neural network; a network parameter is adjusted based on the network losses until the network losses meet a preset condition; and then the training is ended to obtain the first neural network model. The specific training process may be set according to actual requirements, and is not limited in this embodiment of the present disclosure.

In an optional example, the preset operation includes an exponential operation and/or a logarithmic operation.

In an optional example, the preset operation may further include other complex operations besides the exponential operation and the logarithmic operation, which may be specifically set according to actual requirements.

The embodiments or optional examples of the present disclosure may be implemented separately or in any combination without conflict.

According to the present disclosure, the preset operation in the neural network model is converted into the first operation for simulating the lookup table operation, to perform the quantization aware training, so that the operational logic of the simplified target operation is simulated during a training phase. In this case, no new errors are generated after the first operation is converted into the quantized target operation, thereby ensuring that the model accuracy may not decrease. In this way, efficient calculation of a complex function is implemented through a simple lookup table operation while ensuring the model accuracy. When the target neural network model is deployed to the neural network accelerator for processing, because the quantization aware training is performed based on the bit width supported by the neural network accelerator, no new errors are generated during a deployment phase, thereby further ensuring the model accuracy in a case of hardware acceleration, and achieving consistent accuracy between training and deployment of the neural network.

Figure 5:
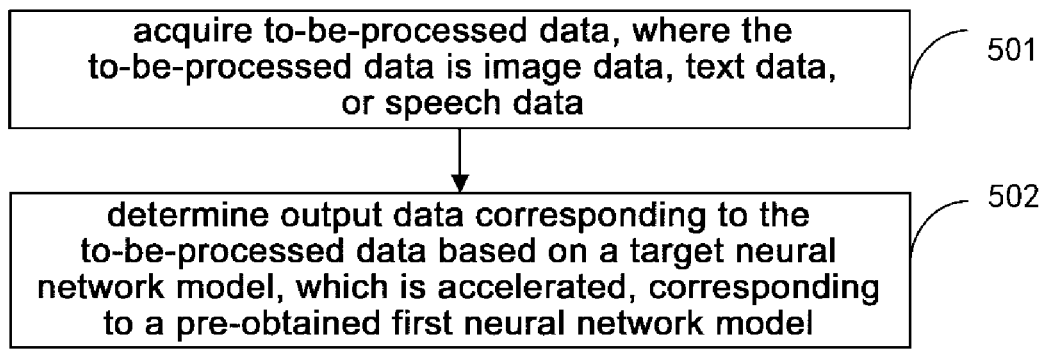
FIG. 5 is a schematic flowchart illustrating a method for accelerating inference of a neural network model according to still another exemplary embodiment of the present disclosure.

FIG. 5 is a schematic flowchart illustrating a method for accelerating inference of a neural network model according to still another exemplary embodiment of the present disclosure. This embodiment may be applied to an electronic device such as a server or a terminal. As shown in FIG. 5, the method in this embodiment includes the following steps.

Step 501. Acquire to-be-processed data, where the to-be-processed data is image data, text data, or speech data.

A specific type of the to-be-processed data may depend on actual requirements. For example, when a first neural network model is a detection model for a road element in an autonomous driving scenario, the to-be-processed data is collected image data of a road environment.

Step 502. Determine output data corresponding to the to-be-processed data based on a target neural network model, which is accelerated, corresponding to a pre-obtained first neural network model.

The target neural network model is obtained by using the method for accelerating inference of a neural network model according to any one of the foregoing embodiments or optional examples. For details, refer to the content described above, and details are not described herein again. A specific inference process of the target neural network model is not described.

According to the present disclosure, data processing is performed by the accelerated target neural network model, and a complex preset operation is processed efficiently based on a simplified target operation, thereby effectively improving data processing efficiency while ensuring model accuracy.

Figure 6:
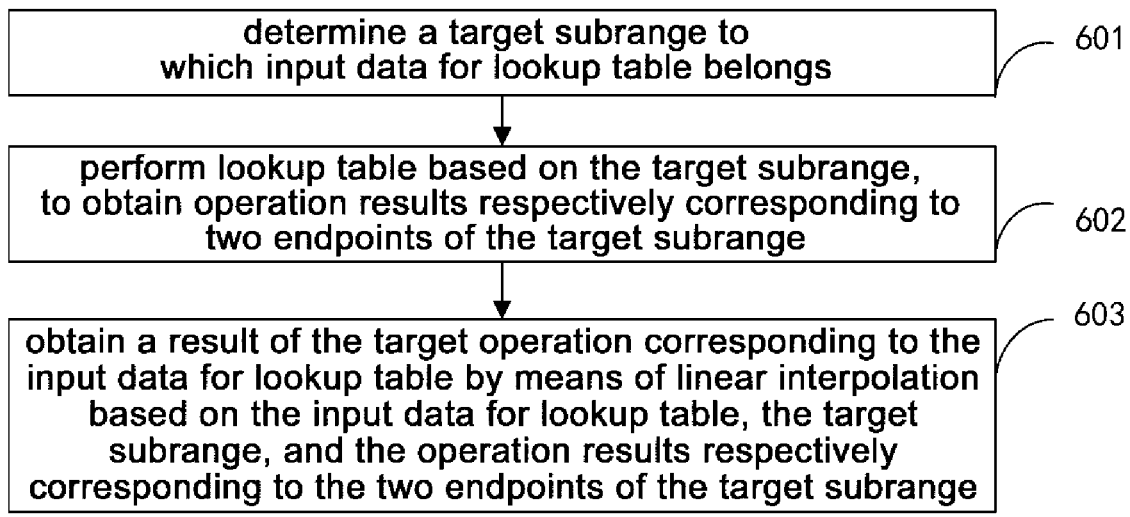
FIG. 6 is a schematic flowchart illustrating a target operation according to an exemplary embodiment of the present disclosure.

In an optional example, FIG. 6 is a schematic flowchart illustrating a target operation according to an exemplary embodiment of the present disclosure. The target operation is a lookup table operation. An operation process of the target operation includes the following steps.

Step 601. Determine a target subrange to which input data for lookup table belongs.

The target subrange may be the subrange in the first input range described above, or may be one of subranges obtained by segmenting a second input range determined based on the range of the input data range of the first operation during the quantization aware training process, which may be specifically set according to actual requirements.

In practical applications, because the target neural network model is a quantized model, each subrange may be a subrange suitable for a type of input data of the target operation of the target neural network model. For example, when the target neural network model is an int8, an endpoint of each subrange may be of a type of int8, which may be specifically set according to actual requirements.

Step 602. Perform lookup table based on the target subrange, to obtain operation results respectively corresponding to two endpoints of the target subrange.

For a specific lookup table principle of this step, refer to the content described above, and details are not described herein again.

Step 603. Obtain a result of the target operation corresponding to the input data for lookup table by means of linear interpolation based on the input data for lookup table, the target subrange, and the operation results respectively corresponding to the two endpoints of the target subrange.

For specific operations of this step, refer to the content described above, and details are not described herein again.

According to the present disclosure, a complex preset operation is processed efficiently through a lookup table operation, thereby effectively improving data processing efficiency while ensuring model accuracy.

Any method for accelerating inference of a neural network model provided in the embodiments of the present disclosure may be implemented by any suitable device with a data processing capability, including but not limited to a terminal device and a server. Alternatively, any method for accelerating inference of a neural network model provided in the embodiments of the present disclosure may be implemented by a processor. For example, the processor implements any method for accelerating inference of a neural network model described in the embodiments of the present disclosure by invoking corresponding instructions stored in a memory. Details are not described below again.

Exemplary Apparatus

Figure 7:
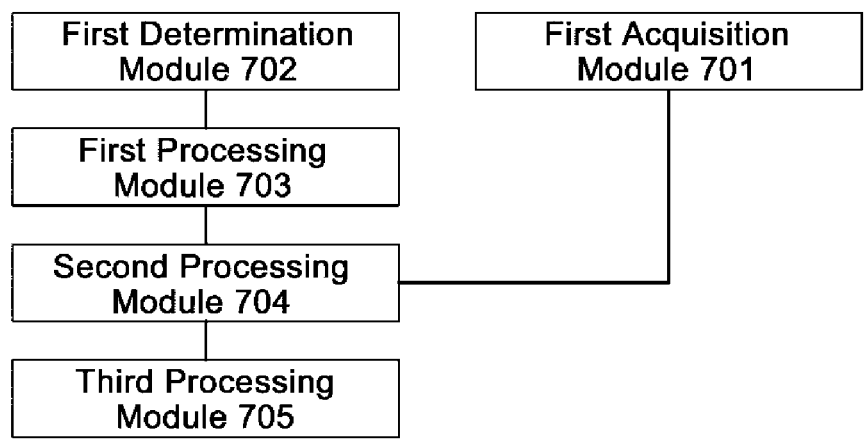
FIG. 7 is a schematic block diagram illustrating an apparatus for accelerating inference of a neural network model according to an exemplary embodiment of the present disclosure.

FIG. 7 is a schematic block diagram illustrating an apparatus for accelerating inference of a neural network model according to an exemplary embodiment of the present disclosure. The apparatus in this embodiment may be configured to implement the corresponding method embodiments of the present disclosure. The apparatus shown in FIG. 7 includes a first acquisition module 701, a first determination module 702, a first processing module 703, a second processing module 704, and a third processing module 705.

The first acquisition module 701 is configured to acquire image training data, text training data, or speech training data. The first determination module 702 is configured to determine a first neural network model to be accelerated. The first processing module 703 is configured to convert a preset operation, on a preset network layer in the first neural network model determined by the first determination module 702, to a first operation for simulating operational logic of a target operation to obtain a second neural network model. The second processing module 704 is configured to perform, based on the image training data, the text training data, or the speech training data, quantization aware training on the second neural network model obtained by the first processing module 703 according to a preset bit width to obtain a third neural network model which is quantized. The preset bit width is a bit width supported by a neural network accelerator for data processing. The third processing module 705 is configured to convert the first operation of the third neural network model obtained by the second processing module 704 to the target operation, to obtain a target neural network model, which is accelerated, corresponding to the first neural network model.

Figure 8:
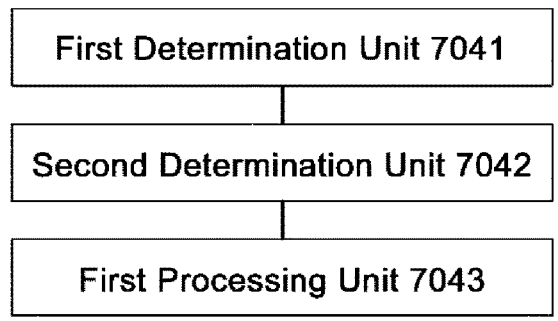
FIG. 8 is a schematic block diagram illustrating a second processing module according to an exemplary embodiment of the present disclosure.

In an optional example, FIG. 8 is a schematic block diagram illustrating a second processing module 704 according to an exemplary embodiment of the present disclosure. In this example, the target operation is a lookup table operation. The second processing module 704 includes a first determination unit 7041, a second determination unit 7042, and a first processing unit 7043.

The first determination unit 7041 is configured to determine a first subrange to which first input data of the first operation belongs. The second determination unit 7042 is configured to determine operation results respectively corresponding to two endpoints of the first subrange according to a preset manner. The first processing unit 7043 is configured to obtain a first operation result corresponding to the first input data by means of linear interpolation based on the first input data, the first subrange, and the operation results respectively corresponding to the two endpoints of the first subrange.

Figure 9:
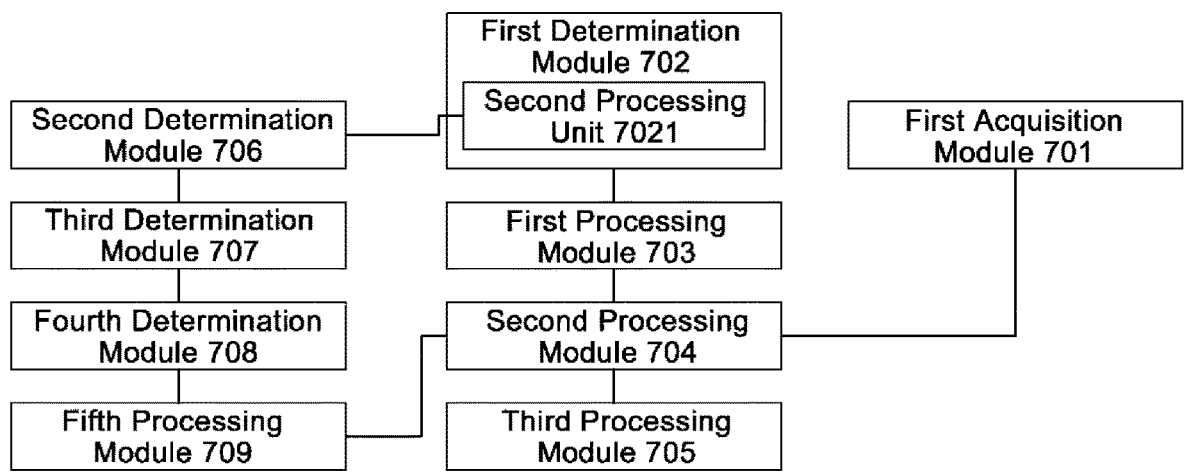
FIG. 9 is a schematic block diagram illustrating an apparatus for accelerating inference of a neural network model according to another exemplary embodiment of the present disclosure.

FIG. 9 is a schematic block diagram illustrating an apparatus for accelerating inference of a neural network model according to another exemplary embodiment of the present disclosure.

In an optional example, the target operation is a lookup table operation. The apparatus in the present disclosure further includes a second determination module 706, a third determination module 707, a fourth determination module 708, and a fifth processing module 709.

The second determination module 706 is configured to determine a first input range based on input data of the preset operation during a training process of the first neural network model. The third determination module 707 is configured to segment the first input range based on a preset segment number, to obtain the preset segment number of subranges. The fourth determination module 708 is configured to determine, for each subrange, operation results respectively corresponding to two endpoints of the subrange based on the preset operation. The fifth processing module 709 is configured to store each subrange and the operation result respectively corresponding to each endpoint of each subrange, to be used for a lookup table operation.

In an optional example, the first determination module 702 includes a second processing unit 7021 that is configured to train a pre-established neural network based on preset training data to obtain the first neural network model.

In an optional example, the preset operation includes an exponential operation and/or a logarithmic operation.

Figure 10:
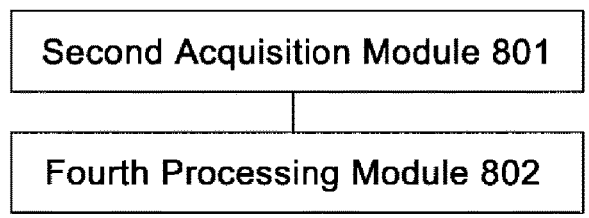
FIG. 10 is a schematic block diagram illustrating an apparatus for accelerating inference of a neural network model according to still another exemplary embodiment of the present disclosure.

FIG. 10 is a schematic block diagram illustrating an apparatus for accelerating inference of a neural network model according to still another exemplary embodiment of the present disclosure. The apparatus in this embodiment may be configured to implement the corresponding method embodiments of the present disclosure. The apparatus shown in FIG. 10 includes a second acquisition module 801 and a fourth processing module 802.

The second acquisition module 801 is configured to acquire to-be-processed data, where the to-be-processed data is image data, text data, or speech data. The fourth processing module 802 is configured to determine output data corresponding to the to-be-processed data based on a target neural network model, which is accelerated, corresponding to a pre-obtained first neural network model. The target neural network model is obtained by using the method for accelerating inference of a neural network model according to any one of the foregoing embodiments or optional examples.

Figure 11:
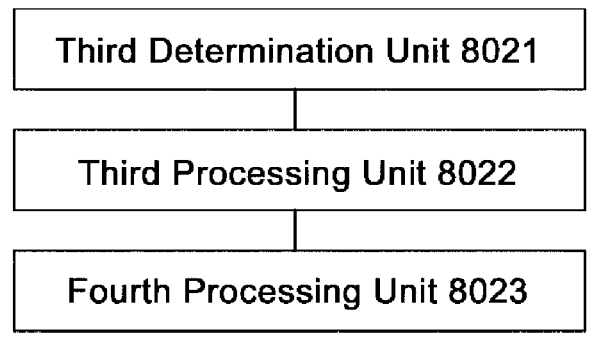
FIG. 11 is a schematic block diagram illustrating a fourth processing module according to an exemplary embodiment of the present disclosure.

FIG. 11 is a schematic block diagram illustrating a fourth processing module 802 according to an exemplary embodiment of the present disclosure.

In an optional example, the target operation is a lookup table operation. The fourth processing module 802 includes a third determination unit 8021, a third processing unit 8022, and a fourth processing unit 8023.

The third determination unit 8021 is configured to determine a target subrange to which input data for lookup table belongs. The third processing unit 8022 is configured to perform lookup table based on the target subrange, to obtain operation results respectively corresponding to two endpoints of the target subrange. The fourth processing unit 8023 is configured to obtain a result of the target operation corresponding to the input data for lookup table by means of linear interpolation based on the input data for lookup table, the target subrange, and the operation results respectively corresponding to the two endpoints of the target subrange.

Exemplary Electronic Device

An embodiment of the present disclosure further provides an electronic device, including: a memory, configured to store a computer program; and a processor, configured to execute the computer program stored in the memory, where when the computer program is executed, the method for accelerating inference of a neural network model according to any one of the foregoing embodiments of the present disclosure is implemented.

Figure 12:
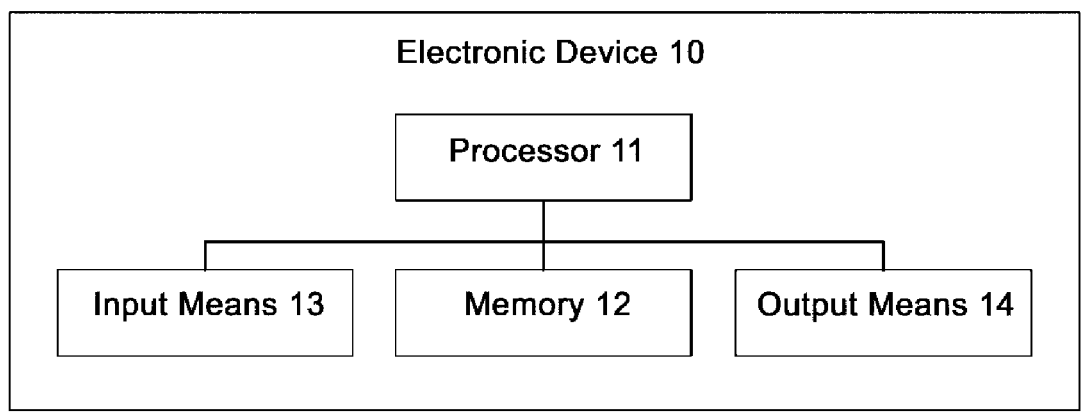
FIG. 12 is a schematic block diagram illustrating an electronic device according to an application embodiment of the present disclosure.

FIG. 12 is a schematic block diagram illustrating an electronic device according to an application embodiment of the present disclosure. In this embodiment, an electronic device 10 includes one or more processors 11 and a memory 12.

The processor 11 may be a central processing unit (CPU) or another form of processing unit having a data processing capability and/or an instruction execution capability, and may control another component in the electronic device 10 to perform a desired function.

The memory 12 may include one or more computer program products. The computer program product may include various forms of computer readable storage media, such as a volatile memory and/or a non-volatile memory. The volatile memory may include, for example, a random access memory (RAM) and/or a cache. The nonvolatile memory may include, for example, a read-only memory (ROM), a hard disk, and a flash memory. One or more computer program instructions may be stored on the computer readable storage medium. The processor 11 may execute the program instruction to implement the method according to various embodiments of the present disclosure that are described above and/or other desired functions.

In an example, the electronic device 10 may further include an input means 13 and an output means 14. These components are connected to each other through a bus system and/or another form of connection mechanism (not shown).

For example, the input means 13 may be a microphone or a microphone array, which is configured to capture an input signal of a sound source.

In addition, the input means 13 may further include, for example, a keyboard and a mouse.

The output means 14 may output various information to the outside. The output means 14 may include, for example, a display, a speaker, a printer, a communication network, and a remote output means connected by the communication network.

Certainly, for simplicity, FIG. 12 shows only some of components in the electronic device 10 that are related to the present disclosure, and components such as a bus and an input/output interface are omitted. In addition, according to specific application situations, the electronic device 10 may further include any other appropriate components.

Exemplary Computer Program Product and Computer Readable Storage Medium

In addition to the foregoing method and device, the embodiments of the present disclosure may also relate to a computer program product, which includes computer program instructions. When the computer program instructions are run by a processor, the processor is enabled to perform the steps, of the method according to the embodiments of the present disclosure, that are described in the "exemplary method" part of this specification.

The computer program product may be program code, written with one or any combination of a plurality of programming languages, that is configured to perform the operations in the embodiments of the present disclosure. The programming languages include an object-oriented programming language such as Java or C++, and further include a conventional procedural programming language such as a "C" language or a similar programming language. The program code may be entirely or partially executed on a user computing device, executed as an independent software package, partially executed on the user computing device and partially executed on a remote computing device, or entirely executed on the remote computing device or a server.

In addition, the embodiments of the present disclosure may further relate to a computer readable storage medium, which stores a computer program instruction. When the computer program instruction is run by the processor, the processor is enabled to perform the steps, of the method according to the embodiments of the present disclosure, that are described in the "exemplary method" part of this specification.

The computer readable storage medium may be one readable medium or any combination of a plurality of readable media. The readable medium may be a readable signal medium or a readable storage medium. The readable storage medium may include, for example, but is not limited to electricity, magnetism, light, electromagnetism, infrared ray, or a semiconductor system, an apparatus, or a device, or any combination of the above. More specific examples (a non-exhaustive list) of the readable storage medium include: an electrical connection with one or more conducting wires, a portable disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above.

Basic principles of the present disclosure are described above in combination with specific embodiments. However, it should be pointed out that the advantages, superiorities, and effects mentioned in the present disclosure are merely examples but are not for limitation, and it cannot be considered that these advantages, superiorities, and effects are necessary for each embodiment of the present disclosure. In addition, specific details described above are merely for examples and for ease of understanding, rather than limitations. The details described above do not limit that the present disclosure must be implemented by using the foregoing specific details.

The various embodiments in this specification are all described in a progressive way, and each embodiment focuses on a difference from other embodiments. For same or similar parts among the various embodiments, reference may be made to each other. The system embodiments basically correspond to the method embodiments, and thus are relatively simply described. For related parts, reference may be made to a part of the descriptions of the method embodiments.

The method and the apparatus in the present disclosure may be implemented in many ways. For example, the method and the apparatus in the present disclosure may be implemented by software, hardware, firmware, or any combination of the software, the hardware, and the firmware. The foregoing sequence of the steps of the method is for illustration only, and the steps of the method in the present disclosure are not limited to the sequence specifically described above, unless otherwise specifically stated in any other manner. In addition, in some embodiments, the present disclosure may also be implemented as programs recorded in a recording medium. These programs include machine-readable instructions for implementing the method according to the present disclosure. Therefore, the present disclosure further relates to a recording medium storing a program for implementing the method according to the present disclosure.

The foregoing descriptions are given for illustration and description. In addition, the description is not intended to limit the embodiments of the present disclosure to forms disclosed herein. Although a plurality of exemplary aspects and embodiments have been discussed above, a person skilled in the art may recognize certain variations, modifications, changes, additions, and sub-combinations thereof.

What is claimed is:

1. A computer-implemented method for accelerating inference of a neural network model, including:
   acquiring image training data, text training data, or speech training data;
   determining a first neural network model to be accelerated;
   converting a preset operation on a preset network layer in the first neural network model to a first operation for simulating operational logic of a target operation to obtain a second neural network model;
   performing, based on the image training data, the text training data, or the speech training data, quantization aware training on the second neural network model by a preset bit width to obtain a third neural network model which is quantized, wherein the preset bit width is a bit width supported by a neural network accelerator for data processing; and
   converting the first operation of the third neural network model to the target operation, to obtain a target neural network model, which is accelerated, corresponding to the first neural network model.

2. The method according to claim 1, wherein the target operation is a lookup table operation; and the first operation includes:
   determining a first subrange to which first input data of the first operation belongs;

determining operation results respectively corresponding to two endpoints of the first subrange according to a preset manner; and obtaining a first operation result corresponding to the first input data by means of linear interpolation based on the first input data, the first subrange, and the operation results respectively corresponding to the two endpoints of the first subrange.

3. The method according to claim 1, wherein the target operation is a lookup table operation; and after the determining of the first neural network model to be accelerated, the method further includes:

determining a first input range based on input data of the preset operation during a training process of the first neural network model;

segmenting the first input range based on a preset segment number, to obtain the preset segment number of subranges;

determining, for each subrange, operation results respectively corresponding to two endpoints of the subrange based on the preset operation; and storing each subrange and the operation result respectively corresponding to each endpoint of each subrange, to be used for a lookup table operation.

4. The method according to claim 1, wherein the determining of the first neural network model to be accelerated includes:

training a pre-established neural network based on preset training data to obtain the first neural network model.

5. The method according to claim 1, wherein the preset operation includes an exponential operation and/or a logarithmic operation.

6. A computer-implemented method for accelerating inference of a neural network model, including:

acquiring to-be-processed data, wherein the to-be-processed data is image data, text data, or speech data; and determining output data corresponding to the to-be-processed data based on a target neural network model, which is accelerated, corresponding to a pre-obtained first neural network model, wherein the target neural network model is obtained by using the method for accelerating inference of a neural network model according to claim 1.

7. The method according to claim 6, wherein the target operation is a lookup table operation; and an operation process of the target operation includes:

determining a target subrange to which input data for lookup table belongs;

performing lookup table based on the target subrange, to obtain operation results respectively corresponding to two endpoints of the target subrange; and obtaining a result of the target operation corresponding to the input data for lookup table by means of linear interpolation based on the input data for lookup table, the target subrange, and the operation results respectively corresponding to the two endpoints of the target subrange.

8. A computer readable storage medium, in which a computer program is stored, wherein the computer program is used for implementing the method for accelerating inference of a neural network model according to claim 1.

9. The computer readable storage medium according to claim 8, wherein the target operation is a lookup table operation; and the first operation includes:

determining a first subrange to which first input data of the first operation belongs;

determining operation results respectively corresponding to two endpoints of the first subrange according to a preset manner; and obtaining a first operation result corresponding to the first input data by means of linear interpolation based on the first input data, the first subrange, and the operation results respectively corresponding to the two endpoints of the first subrange.

10. The computer readable storage medium according to claim 8, wherein the target operation is a lookup table operation; and after the determining of the first neural network model to be accelerated, the method further includes:

determining a first input range based on input data of the preset operation during a training process of the first neural network model;

segmenting the first input range based on a preset segment number, to obtain the preset segment number of subranges;

determining, for each subrange, operation results respectively corresponding to two endpoints of the subrange based on the preset operation; and storing each subrange and the operation result respectively corresponding to each endpoint of each subrange, to be used for a lookup table operation.

11. The computer readable storage medium according to claim 8, wherein the determining of the first neural network model to be accelerated includes:

training a pre-established neural network based on preset training data to obtain the first neural network model.

12. The computer readable storage medium according to claim 8, wherein the preset operation includes an exponential operation and/or a logarithmic operation.

13. A computer readable storage medium, in which a computer program is stored, wherein the computer program is used for implementing a method for accelerating inference of a neural network model, wherein the method includes:

acquiring to-be-processed data, wherein the to-be-processed data is image data, text data, or speech data; and determining output data corresponding to the to-be-processed data based on a target neural network model, which is accelerated, corresponding to a pre-obtained first neural network model, wherein the target neural network model is obtained by using the method for accelerating inference of a neural network model according to claim 1.

14. The computer readable storage medium according to claim 13, wherein the target operation is a lookup table operation; and an operation process of the target operation includes:

determining a target subrange to which input data for lookup table belongs;

performing lookup table based on the target subrange, to obtain operation results respectively corresponding to two endpoints of the target subrange; and obtaining a result of the target operation corresponding to the input data for lookup table by means of linear interpolation based on the input data for lookup table, the target subrange, and the operation results respectively corresponding to the two endpoints of the target subrange.

15. An electronic device, including:

a processor; and a memory, configured to store a processor-executable instruction, wherein the processor is configured to read the executable instruction from the memory, and execute the instruction to implement the method for accelerating inference of a neural network model according to claim 1.

16. The electronic device according to claim 15, wherein the target operation is a lookup table operation; and the first operation includes:

determining a first subrange to which first input data of the first operation belongs;

determining operation results respectively corresponding to two endpoints of the first subrange according to a preset manner; and obtaining a first operation result corresponding to the first input data by means of linear interpolation based on the first input data, the first subrange, and the operation results respectively corresponding to the two endpoints of the first subrange.

17. The electronic device according to claim 15, wherein the target operation is a lookup table operation; and after the determining of the first neural network model to be accelerated, the method further includes:

determining a first input range based on input data of the preset operation during a training process of the first neural network model;

segmenting the first input range based on a preset segment number, to obtain the preset segment number of subranges;

determining, for each subrange, operation results respectively corresponding to two endpoints of the subrange based on the preset operation; and storing each subrange and the operation result respectively corresponding to each endpoint of each subrange, to be used for a lookup table operation.

18. The electronic device according to claim 15, wherein the determining of the first neural network model to be accelerated includes:

training a pre-established neural network based on preset training data to obtain the first neural network model.

19. The electronic device according to claim 15, wherein the preset operation includes an exponential operation and/or a logarithmic operation.

20. An electronic device, including:

a processor; and a memory, configured to store a processor-executable instruction, wherein the processor is configured to read the executable instruction from the memory, and execute the instruction to implement a method for accelerating inference of a neural network model, wherein the method includes:

acquiring to-be-processed data, wherein the to-be-processed data is image data, text data, or speech data; and determining output data corresponding to the to-be-processed data based on a target neural network model, which is accelerated, corresponding to a pre-obtained first neural network model, wherein the target neural network model is obtained by using the method for accelerating inference of a neural network model according to claim 1.

* * * * *